United States Patent Office 3,692,651
Patented Sept. 19, 1972

3,692,651
PROCESS FOR PREPARING CIS 5-FLUORO-2-METHYL - 1 - (p-METHYLSULFINYLBENZYL-IDENE)-3-INDENYL ACETIC ACID
Meyer Sletzinger, 135 Rockview Ave., North Plainfield, N.J. 07060; Ronald Harmetz, Willow Drive, R.D. 3, Dover, N.J. 07801; and Donald F. Reinhold, 564 Parkview Ave., North Plainfield, N.J. 07060
No Drawing. Filed May 1, 1970, Ser. No. 33,975
Int. Cl. C07c 147/14
U.S. Cl. 204—158 R
2 Claims

ABSTRACT OF THE DISCLOSURE

Isomerization of trans 5-fluoro-2-methyl-1-(p-methylsulfinylbenzylidene)-3-indenyl acetic acid to its cis isomer.

---

This invention relates to a process for preparing cis-5-fluoro-2-methyl - 1 - (p-methylsulfinylbenzylidene)-3-indenyl acetic acid.

Cis 5-fluoro-2-methyl-1-(p - methylsulfinylbenzylidene)-3-indenyl acetic acid has anti-inflammatory, anti-pyretic and analgesic activity and is useful in the treatment of diseases which exhibit pain, fever or inflammation. The cis isomer is that isomer in which the benzylidene function is aligned under the phenyl ring of the indene nucleus. For these purposes this compound may be administered topically, orally, rectally or parenterally in dosage ranges of from about 0.1 mg. to 50 mg./kg. body weight per day (preferably from about 1 mg. to 15 mg./kg. body weight per day).

It is an object of this invention to provide a new process for preparing the aforementioned compound from the trans isomer or a mixture of the cis and trans isomers. It is a further object to provide an isomerization process for the preparation of the aforementioned which is both more economical and more efficient than existing methods of preparing benzylidene indene acids.

In accordance with this invention, it has been discovered that trans-5-fluoro-2-methyl-1-(p-methylsulfinylbenzylidene)-3-indenyl acetic acid may be converted to its cis isomer by using iodine as the isomerization catalyst, or by using ultraviolet radiation or other suitable means as an isomerization catalyst.

The process of this invention may be carried out by dissolving the trans isomer or a mixture of the cis and trans isomers in a suitable solvent such as benzene, chloroform, dimethyl sulfoxide, triethylamine, etc. and treating the solution with about 0.2–1.0% (by weight) of iodine.

Alternatively, the process of this invention may be carried out by dissolving the trans isomer or a mixture of the cis and trans isomers in a suitable solvent such as methanol or ethanol and irradiating the material with ultra violet light to convert the trans isomer to the cis isomer.

The starting material for this isomerization process may be prepared by producing 6-fluoro-2-methyl indanone in a known manner and reacting the indanone with cyanoacetic acid to introduce the acetic acid side chain, reacting the thus-produced indene-3-acetic acid with p-methylthiobenzaldehyde and oxidizing the resultant product to form 5-fluoro-2-methyl-1-(p-methylsulfinylbenzylidene)-3-indenyl acetic acid.

It should be noted by one skilled in the art that this compound is optically active and may be resolved into its (+) and (−) forms by procedures well known in the art.

It should be further noted by one skilled in the art that this compound is polymorphic and has more than one crystalline structure.

The following examples are presented to further illustrate this invention.

EXAMPLE 1

(A) 5-fluoro-2-methylindene-3-acetic acid

A mixture of 6-fluoro-2-methylindanone (18.4 g., 0.112 mole), cyanacetic acid (10.5 g., 0.123 mole), acetic acid (6.6 g.), and ammonium acetate (1.7 g.) in dry toluene (15.5 ml.) is refluxed with stirring for 21 hours, as the liberated water is collected in a Dean-Stark trap. The toluene is concentrated and the residue dissolved in 60 ml. of hot ethanol and 14 ml. of 2.2 N aqueous potassium hydroxide solution. 22 g. of 85% KOH in 150 ml. of water is added and the mixture refluxed for 13 hours under $N_2$. The ethanol is removed under vacuum, 500 ml. water added, the aqueous solution washed well with ether and then boiled with charcoal. The aqueous filtrate is acidified to pH 2 with 50% hydrochloric acid, cooled and the precipitate collected. In this way dried 5-fluoro-2-methylindenyl-3-acetic acid (M.P. 164–166°) is obtained.

(B) 5-fluoro-2-methyl-1-(p-methylthiobenzylidene)-3-indenyl acetic acid

5-fluoro-2-methyl-3-indenylacetic acid (15 g., 0.072 mole) p-methylthiobenzaldehyde (14.0 g., 0.091 mole) and sodium methoxide (13.0 g., 0.24 mole) are heated in methanol (200 ml.) at 60° under nitrogen with stirring for 6 hours. After cooling the reaction mixture is poured into 750 ml. of ice-water, acidified with 2.5 N hydrochloric acid and the collected solid triturated with a little ether to produce 5-fluoro-2-methyl-1-(p-methylthiobenzylidene)-3-indenylacetic acid (M.P. 187–188.2°).

(C) 5-fluoro-2-methyl-1-(p-methylsulfinylbenzylidene)-3-indenylacetic acid

To a solution of 5-fluoro-2-methyl-1-(p-methylthiobenzylidene)-3-indenylacetic acid (3.4 g., 0.01 mole) in a mixture of methanol (250 ml.) and acetone (100 ml.) is added a solution of sodium periodate (3.8 g., 0.018 mole) in water (50 ml.) with stirring.

Water (450 ml.) is added after 18 hours and the organic solvents removed under vacuum below 30°. The precipitated product is filtered, dried and recrystallized from ethyl acetate to give 5-fluoro-2-methyl-1-(p-methylsulfinylbenzylidene)-3-indenylacetic acid, M.P. 184–186°.

(D) Cis-5-fluoro-2-methyl-1-(p-methylsulfinylbenzylidene)-3-indenyl acetic acid

In a 100 ml. flask equipped with a mechanical stirrer and condenser are placed 50 ml. of benzene and 0.0294 M of 5-fluoro-2-methyl-1-(p-methylsulfinylbenzylidene)-3-indene acetic acid. The mixture is heated until solution takes place and then 0.5 g. of Darcon G–60 is added. The solution is refluxed for 0.5 hour, filtered hot through a prewashed Ertel pad and the carbon cake washed with 2× 5 ml. of 75–80° C. benzene.

To the combined filtrate and carbon wash is added 28 milligrams of iodine and the mixture refluxed for 3 hours. The solution is cooled to 63–65° C. and stirred until crystallization occurs.

The batch is heated to 70–73° C., aged 0.5 hour at this temperature and then cooled slowly (5° C./15 minutes) to 20–23° C. and aged 16 hours at this temperature.

The solution is filtered and the product washed with 2× 7 ml. of benzene (20–22° C.) and dried in vacuo (3 mm.) at 110° C. to yield cis-5-fluoro-2-methyl-1-(p-methylsulfinylbenzylidene) - 3 - indenyl acetic acid, M.P. 184–186° C.

EXAMPLE 2

(A) 5-fluoro-2-methylidene-3-acetic acid

A mixture of 6-fluoro-2-methylindanone (18.4 g., 0.112 mole), cyanacetic acid (10.5 g., 0.123 mole), acetic acid (6.6 g.), and ammonium acetate (1.7 g.) in dry toluene (15.5 ml.) is refluxed with stirring for 21 hours, as the liberated water is collected in a Dean-Stark trap. The toluene is concentrated and the residue dissolved in 60 ml. of hot ethanol and 14 ml. of 2.2 N aqueous potassium hydroxide solution. 22 g. of 85% KOH in 150 ml. of water is added and the mixture refluxed for 13 hours under $N_2$. The ethanol is removed under vacuum, 500 ml. water added, the aqueous solution washed well with ether and then boiled with charcoal. The aqueous filtrate is acidified to pH 2 with 50% hydrochloric acid, cooled and the precipitate collected. In this way dried 5-fluoro-2-methylindenyl-3-acetic acid (M.P. 164–166°) is obtained.

(B) 5-fluoro-2-methyl-1-(p-methylthiobenzylidene)-3-indenyl acetic acid 5-fluoro-2-methyl-3-indenylacetic acid (15 g., 0.072 mole) p-methylthiobenzaldehyde (14.0 g., 0.091 mole) and sodium methoxide (13.0 g., 0.24 mole) are heated in methanol (200 ml.) at 60° under nitrogen with stirring for 6 hours. After cooling the reaction mixture is poured into 750 ml. of ice-water, acidified with 2.5 N hydrochloric acid and the collected solid triturated with a little ether to produce 5-fluoro-2-methyl-1-(p-methylthiobenzylidene)-3-indenylacetic acid (M.P. 187–188.2°).

(C) 5-fluoro-2-methyl-1-(p-methylsulfinylbenzylidene)-3-indenylacetic acid

To a solution of 5-fluoro-2-methyl-1-(p-methylthiobenzylidene)-3-indenylacetic acid (3.4 g., 0.01 mole) in a mixture of methanol (250 ml.) and acetone (100 ml.) is added a solution of sodium periodate (3.8 g., 0.018 mole) in water (50 ml.) with stirring.

Water (450 ml.) is added after 18 hours and the organic solvents removed under vacuum below 30°. The precipitated product is filtered, dried and recrystallized from ethyl acetate to give 5-fluoro-2-methyl-1-(p-methylsulfinylbenzylidene)-3-indenylacetic acid, M.P. 184–186°.

(D) Cis-5-fluoro-2-methyl-1-(p-methylsulfinylbenzylidene)-3-indenylacetic acid A solution of 13.1 g. of trans-5-fluoro-2-methyl-1-(p-methylsulfonylbenzylidone)-3-indenyl acetic acid in 2 liters of methanol is irradiated with UV light for 24 hours. The methanol is evaporated in vacuo and the residue crystallized from ethyl acetate to give substantially pure cis isomer, M.P. 184–186° C.

What is claimed is:

1. A process for the preparation of cis 5-fluoro-2-methyl-1-(p-methylsulfinylbenzylidene)-3-indenyl acetic acid which comprises using iodine to convert a solution of the trans isomer to the cis isomer.

2. A process for the preparation of cis 5-fluoro-2-methyl-1-(p-methylsulfinylbenzylidene)-3-indenyl acetic acid which comprises exposing a solution of the trans isomer to ultra violet light in order to convert it to the cis isomer.

References Cited

Lindenfors, Arkiv for Kemi, vol. 12, No. 29 (1958), pp. 267–279.

JAMES A. PATTEN, Primary Examiner

U.S. Cl. X.R.

260—515 A, 516